United States Patent
Emmons, Jr. et al.

(10) Patent No.: US 9,785,702 B1
(45) Date of Patent: Oct. 10, 2017

(54) ANALYTICAL SCORING ENGINE FOR REMOTE DEVICE DATA

(75) Inventors: Stephen P. Emmons, Jr., Carrolton, TX (US); Jeffrey O. Smith, Dallas, TX (US); Richard Burtner, Broadlands, VA (US); Henry S. Rosen, Dallas, TX (US)

(73) Assignee: Numerex Corp., Atlanta, GA (US)

( * ) Notice: Subject to any disclaimer, the term of this patent is extended or adjusted under 35 U.S.C. 154(b) by 0 days.

(21) Appl. No.: 13/092,652

(22) Filed: Apr. 22, 2011

Related U.S. Application Data

(60) Provisional application No. 61/327,530, filed on Apr. 23, 2010.

(51) Int. Cl.
| | | |
|---|---|---|
| G06F 17/30 | (2006.01) | |
| G06Q 40/08 | (2012.01) | |
| B60R 16/023 | (2006.01) | |
| G08G 1/01 | (2006.01) | |

(52) U.S. Cl.
CPC .... G06F 17/30702 (2013.01); B60R 16/0231 (2013.01); G06F 17/30412 (2013.01); G06F 17/30572 (2013.01); G06Q 40/08 (2013.01); G08G 1/0129 (2013.01)

(58) Field of Classification Search
CPC ......... G06F 17/30702; G06F 17/30572; G06F 17/30412; G06Q 40/08; B60R 16/0231; G08G 1/0129
IPC ................. G06Q 40/08; B60R 16/0231; G08G 1/0129
See application file for complete search history.

(56) References Cited

U.S. PATENT DOCUMENTS

| | | | | |
|---|---|---|---|---|
| 5,805,079 | A * | 9/1998 | Lemelson | 340/870.05 |
| 6,392,564 | B1 * | 5/2002 | Mackey et al. | 340/937 |
| 7,343,306 | B1 * | 3/2008 | Bates et al. | 705/4 |
| 8,140,358 | B1 * | 3/2012 | Ling et al. | 705/4 |
| 2002/0111725 | A1 * | 8/2002 | Burge | 701/29 |
| 2002/0152115 | A1 * | 10/2002 | Morita et al. | 705/13 |
| 2002/0161731 | A1 * | 10/2002 | Tayebnejad et al. | 706/20 |
| 2002/0186144 | A1 * | 12/2002 | Meunier | 340/825.28 |
| 2004/0198386 | A1 * | 10/2004 | Dupray | 455/456.1 |
| 2005/0131597 | A1 * | 6/2005 | Raz et al. | 701/29 |
| 2006/0229777 | A1 * | 10/2006 | Hudson et al. | 701/29 |
| 2007/0027726 | A1 * | 2/2007 | Warren et al. | 705/4 |
| 2007/0239346 | A1 * | 10/2007 | Hawkins et al. | 701/117 |
| 2007/0266180 | A1 * | 11/2007 | Mitchell et al. | 710/1 |
| 2007/0268158 | A1 * | 11/2007 | Gunderson et al. | 340/933 |
| 2008/0071465 | A1 * | 3/2008 | Chapman et al. | 701/117 |

(Continued)

OTHER PUBLICATIONS

Thearling, Kurt; "Scoring Your Customers", retrieved from the Internet on Apr. 16, 2010; 8 pages, URL <http://www.thearling.com/text/scoring/scoring.htm >.

*Primary Examiner* — Leslie Wong
(74) *Attorney, Agent, or Firm* — King & Spalding LLP

(57) ABSTRACT

A system for data aggregation and analytical scoring is described that includes a gateway operable to aggregate data received from multiple remote devices, and a device history data model storing properties for each of the multiple remote devices and storing the data received from each remote device. A scoring engine in the system acts to aggregate and analyze the data stored in the device history data model and to produce a metric based on the data. The system also includes a notification policy to conditionally notify a user based on the metric produced by the scoring engine.

16 Claims, 3 Drawing Sheets

(56) References Cited

U.S. PATENT DOCUMENTS

2010/0030586 A1\* 2/2010 Taylor et al. .................... 705/4
2010/0152962 A1\* 6/2010 Bennett et al. ................ 701/33
2010/0250021 A1\* 9/2010 Cook et al. ..................... 701/1
2013/0046562 A1\* 2/2013 Taylor et al. .................... 705/4

\* cited by examiner

ANALYTICAL SCORING ENGINE FOR REMOTE DEVICE DATA

CROSS REFERENCE TO RELATED INFORMATION

This application claims the benefit of U.S. Provisional Patent Application No. 61/327,530 filed Apr. 23, 2010, titled "Analytical Scoring Engine for Remote Device Data" the entire contents of which are hereby incorporated by reference.

TECHNICAL FIELD

The present disclosure is directed to analytical data scoring engines, and more particularly to a data collection and scoring system that collects and processes raw data from randomly reporting remote devices, and then selects and scores that data based on user customized data mining models.

BACKGROUND OF THE INVENTION

A prior art data mining and statistical scoring system 100 is shown in FIG. 1. In typical systems a data mining system 102 mines a database of historical data to create a model 103 of a particular behavior or result that can be derived from the historical data. For example, data mining in historical data 101 may determine from personal data and known purchasing history that a certain demographic may be particularly likely to purchase a particular product or type of product. In another example, historical data regarding individual demographics and driving histories may yield insights into insurance risks for drivers.

Once a particular model 103 has been constructed from the historical data, the model can be applied to new data to make predictions about unseen behavior. The process of using a model to make predictions about future events or behavior is called "scoring," and the output of the prediction is referred to as a score. While scores can take any form, most scores are represented as a number, such as a score between 0 and 1 that predicts the likelihood of a future event. The engine that applies model 103 to new data is referred to as a scoring engine, such as scoring engine 105. Scoring engine 105 uses existing data 104 and model 103 to make the prediction, or score, 106.

While there are many general-purpose statistical analysis systems that provide for the aggregation of data by some user-defined criteria and from some user-defined source, none of the existing systems are able to process raw data from randomly reporting remote devices or to score data from these sources based on a user-defined model. The existing systems provide general approaches for handling statistics or population scoring, but do not address unique issues arising from remote or raw/unprocessed device data.

BRIEF SUMMARY OF THE INVENTION

The present invention describes an embodiment of a system for data aggregation and analytical scoring. The system includes a gateway operable to aggregate data received from multiple remote devices, and a device history data model storing properties for each of the multiple remote devices and storing the data received from each remote device. A scoring engine in the system acts to aggregate and analyze the data stored in the device history data model and to produce a metric based on the data. The system also includes a notification policy to conditionally notify a user based on the metric produced by the scoring engine.

In another embodiment, a method for collecting and scoring data from a plurality of remote devices is described. The method includes receiving data from the plurality of remote devices and storing the data and a time of receipt of each data element and conditioning the data received from the plurality of remote devices into a form usable by a scoring engine. The method produces a metric using the scoring engine based on the conditioned data where the scoring engine using the conditioned data, a scope defining a population of remote devices for a particular scoring model, and a time period. The metric is then made available to a user interested in the metric.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
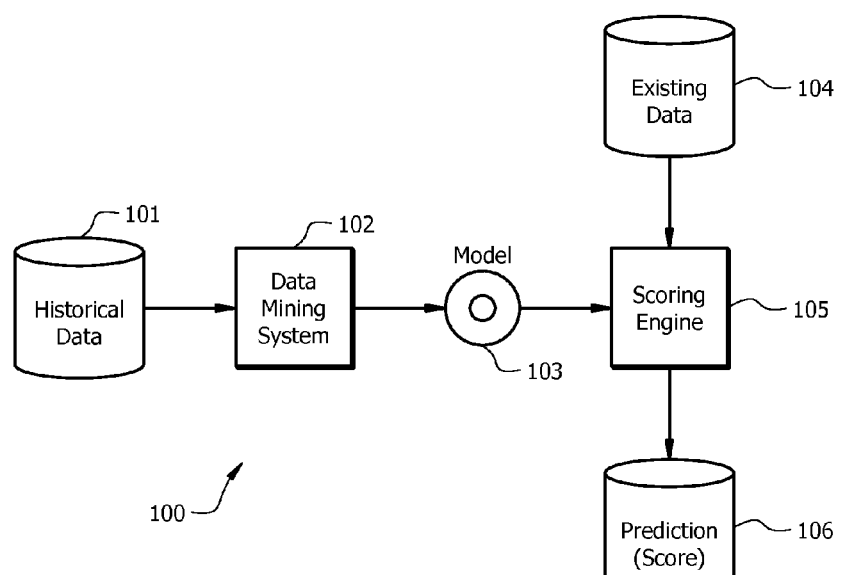
FIG. 1 is a block diagram of a prior art data mining and statistical scoring system.

Referring now to FIG. 1, an embodiment of a system architecture 200 for a data aggregation and analytical scoring system is described. System 200 includes a device communications gateway 203. Embodiments of gateway 203 receive messages from remote devices 202a through 202n over various communications networks, which can include low earth orbit (LOE) satellite (for example, OrbitOne/GlobalStar), GPRS or radio frequency (RF) wireless networks, and/or general IP networks (such as the Internet). The multiple remote devices may send data in disparate formats. Gateway 203 parses messages based on device/ network type to extract encoded data that can be unique for each of devices 202a through 202n. This can include any type of information and may include location information such as latitude/longitude where the device was located when the data was collected. Gateway 203 inserts extracted device data into a processing queue for delivery to the device history data model 204, including the identity of the reporting device as well as both the time when the device recorded its data, and the time when the gateway received the data (referred to as Timestamps). The time of data collection and data receipt by system 200 may be different and such differences can influence the scoring process.

Embodiments of device history data model 204 maintain the population of devices that can report data, including the network over which it can communicate and its unique identity on that network. Device history data model 204 also maintains a history of readings received from each device and maintains properties for each device. Combinations of devices can define one or more sub-populations, or "scopes," against which devices maybe scored based on their historical readings. Data is analyzed based on programmable scopes, events and periods, where the programmable scopes define a population of remote devices for each particular scoring model. Device history data model 204 receives readings queued up by gateway 203 for availability to scoring engine 205.

In preferred embodiments, scoring engine 205 uses scoring engine database 206 to maintain the definition of one or more scopes, wherein each scope defines a set of properties that identify a set of devices, a starting period (date/time) when scoring should begin, the duration of the period for which scoring will be performed (e.g., 1 week, 1 month), and other configurable aspects of how a score should be calculated (e.g., should "night" be considered to be 6 PM-6 AM local time or should it be between sundown and sunset for the latitude/longitude location where the reading was recorded).

Scoring engine 205 also maintains in database 206 a set of "scope events." Each scope event records a period that has been considered in the scoring process for each scope and a set of "scope metrics" that have been calculated for the given scope/period combination. Each scope metric captures the results of the scoring process for a specific device in the scope for a given period. Scoring engine 205 maintains a set of "device measures," each device measure utilized to capture customizable aggregate statistics of data from all readings for each device for a specific period start and duration. This data is collected for all "scorable" devices and is independent of any scope.

Database 206 also can be configured to store a set of periods across all scopes, scope events, scope metrics, and device measures that have been encountered in the course of processing data from device history data model 204. Scoring Engine 205 is operable to process readings for all "scorable" devices to create device measures for each period that has passed after an appropriate waiting period based on the possibility of known variances in the timestamps that can occur for the population of devices. Scoring engine 205 then can create scope events whenever all device measures have been created corresponding to a scoring period (start/duration) defined for a scope, and can create scope metrics for newly created scope events. This can be done by collecting all the device measures for the devices of a scope and applying a customizable scoring evaluation function that can be configured according to algorithms or parameters selected by each user or customer. The results of this evaluation function are stored in customizable attributes of each scope metric.

Scoring engine 205 also can be used to maintain a set of scope/device notification policies. These notification policies can contain customizable information about what kind of notification, typically an email sent to someone interested in a score, if any that should be sent, and when (e.g., it may not be immediate, but on some fixed schedule) after the scoring process has finished and a set of scope metrics have been created.

Notification process 208 checks scope/device notification policies and available scope metrics and sends emails, text messages, etc. as set forth in the policy to recipients 210a through 210n defined by the policy. Web application 207 is a customizable application that can make web pages available to end-users with data queried from either device history model 204 or the scoring engine 205 for whatever purposes are required by the specific deployment using external browsers 209a through 209n.

Figure 2:
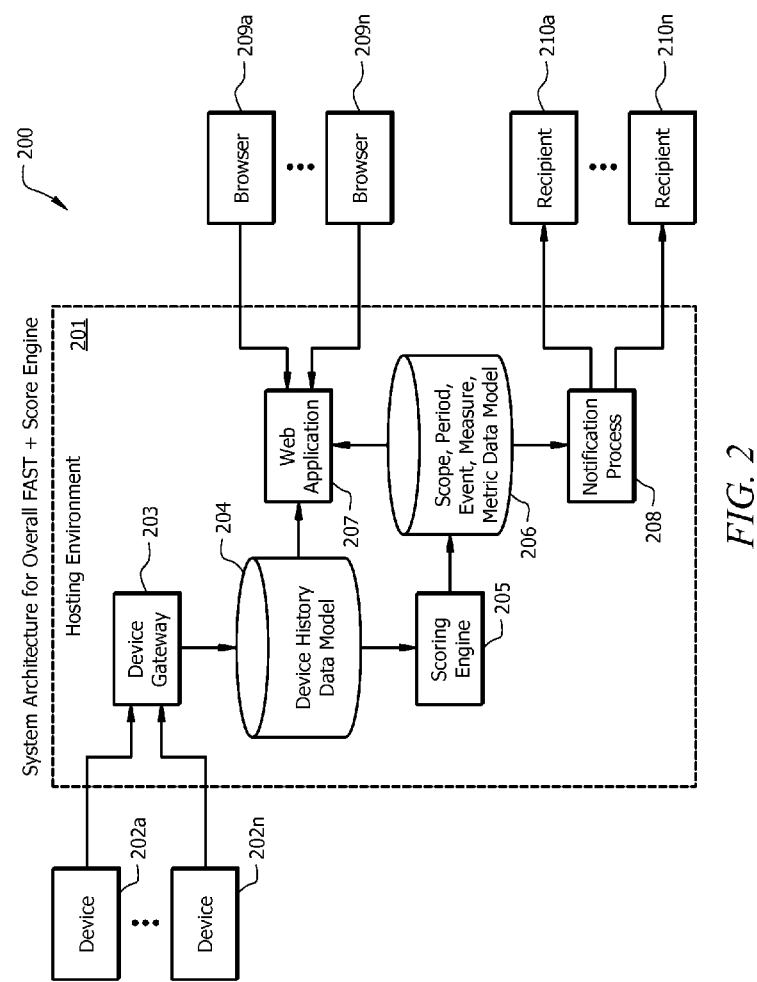
FIG. 2 is a block diagram of an embodiment of an architecture for a data aggregation and analytical scoring engine for a system with multiple remote data gathering devices.
Figure 3:
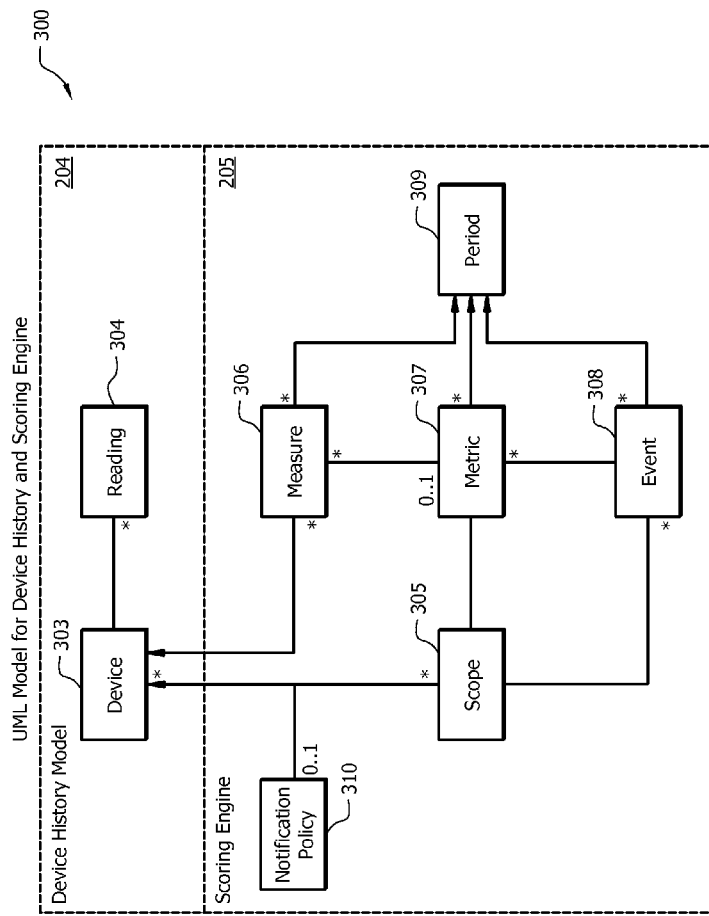
FIG. 3 is a block diagram of an embodiment of a messaging model for device history and scoring engine.

Referring now to FIG. 3, an embodiment of a messaging model 300 for communications between and within device history data model 204 and scoring engine 205 from FIG. 2 is described. In the embodiment shown in FIG. 3, visibility into a particular object is denoted by an arrow head, while a "*" denotes cardinality of 0 or more, no "*" denotes a relationship of 1 and only 1 and a "0 . . . 1" means there may be 0 or 1 associations. Device history data model 204 receives and maintains readings 304 that are associated with a device 303. As described, device history data model 204 maintains readings and device information for any number of devices that report to the system.

Scope object 305 and measure object 306 of scoring engine 205 have visibility into the device information 303 of device history data model 204. As described with reference to FIG. 2, scope defines population of devices for a particular scoring model, and can also include parameters associated with the scoring model, such as the frequency of scoring.

Measure object 306 has the conditioned aggregated data about a device, such as the conditioned data for a period and duration to be scored (i.e. data from 1 pm to 3 pm on Jan. 1, 2010), and the actual data collected by the device (which can be any type of data, such as miles travelled, hard stops, rapid acceleration events, temperature, etc.). Event object 308 contains the triggers for processing the data contained in the measures across the period defined by period 309. The results of the data processing, or scoring, according to a customizable algorithm are captured and stored in a metric record 307. Notification policy 310 determines, based on the data in the metric records if notification of the metric is required.

In general, in messaging model 300 data moves through the system beginning as raw data and from there being conditioned as a measure, measure then being aggregated into scopes and those scopes then being used to generate a metric.

A critical consideration for the successful use of a data aggregation and analytical scoring system of the type described by the concepts described herein is the efficiency and performance of the system. Often one of the biggest performance problems when trying to use existing analytical systems and methods is the mismatch in how the system requires input data to be presented and delivers output data, metrics, or scores with how such information is naturally available from the data collection sources. The system described herein addresses this problem by performing the critical processes involved using a "pipeline" approach which is able to create the intermediate work products of the process as the readings are arriving from the devices in the field, thus distributing the workload over time. Existing products/methods work outside of this context and are not able to function with data as it is being received from devices. Additional data transformation (and resulting performance overhead) would be required to pass data to and from the scoring engine.

To illustrate the system described herein, an example of the operation of an embodiment of the system for an insurance scoring application is described with reference to the system of FIGS. 2 and 3. The example is for the purposes of illustrating one hypothetical application of the system and is not intended to be limiting in scope, application, or design. In the present example an auto insurance company could install mobile devices in cars they insure to determine underwriting risk and premium adjustments. The devices installed in the cars can have GPS capabilities, internal sensors such as accelerometers and can connect to the car's on-board diagnostics. The device can be programmed to monitor status such as location, time of day, distance driven, driving duration, speed, as well as hard stops and fast starts.

The raw data from the device is periodically sent to the device gateway and stored in the device history data model. The raw data is conditioned into measures by selecting data required by the scoring model over a particular time period of interest, such as the number of hard stops over the past hour, day or week. The measures for all the devices included in a particular scope, all of the cars insured by the insurance company in a particular state, for example, are then processed into metrics that relate the individual measures to all the other measure in the scope. In the example of the insurance company, the company can score each of the insured using an algorithm that takes measures related to five pieces of data: distance driven, driving duration, speed threshold exceeded, hard stops and fast starts. The measures can be time weighted and used to produce a driving score for each driver based on the other drivers in the scope, or a base line dataset. The driving score can be used with or without other underwriting criteria to determine the underwriting risk for each driver and/or to adjust premiums accordingly. While insurance has been used as an example the system can be used to score any type of data for any types of devices in essentially real time.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for data aggregation and analytical scoring comprising:
   multiple remote devices, each of the remote devices collecting raw data and reporting the raw data using one or more networks, wherein the multiple remote devices send data in disparate formats;
   a gateway to aggregate the raw data received from the multiple remote devices;
   a device history data model storing properties for each of the multiple remote devices and storing the raw data received from each remote device, the device history data model conditioning the raw data into a measure usable for scoring, the measure used by the scoring engine including normalized data, wherein the multiple remote devices are grouped into scopes, each scope defining a population of remote devices and each scope having a particular scoring model;
   a scoring engine to score the normalized data stored in the device history data model using the particular scoring model and to produce a metric based on the normalized data;
   a database storing a set of scope events, wherein each scope event records a set of scope metrics that have been calculated for a given scope over a selected period; and
   a notification policy that conditionally notifies a user based on a value of the metric produced by the scoring engine, wherein the metric and the value of the metric that triggers notification is programmable by the user.

2. The system of claim 1 wherein the data received from each remote device includes the location of the remote device.

3. The system of claim 1 wherein the system places a timestamp on the raw data received from each of the multiple remote devices, the timestamp including the time the raw data was collected and the time the raw data was received.

4. The system of claim 1 wherein the scoring engine further includes a selectable period for producing the metric.

5. The system of claim 4 wherein the scoring engine weights new data more heavily to produce the metric for the selectable period.

6. The system of claim 1 wherein the scoring engine produces a metric data model that holds searchable results for the metric produced by the scoring engine from the aggregated data.

7. A method for collecting and scoring data from a plurality of remote devices, the method comprising:
   receiving raw data from the plurality of remote devices and storing the raw data and a time of receipt of each raw data element, wherein the plurality of remote devices send data in disparate formats;
   conditioning the raw data received from the plurality of remote devices into conditioned data usable by a scoring engine, wherein the multiple remote devices are grouped into scopes, each scope defining a population of remote devices and each scope having a particular scoring model;
   producing a metric with the scoring engine based on the conditioned data, the scoring engine using the conditioned data, the scope, the particular scoring model, and a time period;
   storing a set of scope events in a database associated with the scoring engine, wherein each scope event records a set of scope metrics that have been calculated for a given scope over a selected period; and
   sending the metric available to a user interested in the metric using a conditional notification policy dependent on the value of the metric.

8. The method of claim 7 wherein the metric is made available to the user through a notification process.

9. The method of claim 7 wherein the metric is made available to the user by providing the user access to the metric through an interface into a database holding the metric.

10. The method of claim 7 further comprising storing the metric and associated scope and time period in a database.

11. The method of claim 7 wherein the raw data received from each remote device includes the location of the remote device.

12. The method of claim 7 wherein the system places a timestamp on the raw data received from each of the multiple remote devices, the timestamp including the time the data was collected and the time the data was received.

13. A system for analytical scoring, the system comprising:
    multiple remote devices collecting raw data related to its environment, each of the multiple remote devices sending the raw data to the system over one or more networks, wherein the multiple remote devices send data in disparate formats;
    a gateway receiving and aggregating the raw data received from the multiple remote devices;
    a device history data model storing properties for each of the multiple remote devices, including information on the data reporting protocol of the device, storing the raw data received from each remote device, and storing a timestamp on the raw data received from each of the multiple remote devices, the timestamp including the time the raw data was collected and the time the raw data was received, wherein the device history data model conditions the raw data into conditioned data for scoring, wherein the multiple remote devices are grouped into programmable scopes, each programmable scope defining a population of remote devices and each scope having a particular scoring model;
    a scoring engine to analyze the conditioned data stored in the device history data model and to produce a metric based on the data, wherein the conditioned data is analyzed based on the programmable scopes, particular scoring models, events and periods;
    a scoring engine database storing the metrics produced by the scoring engine in addition to the associated scopes, events and periods; and
    a notification policy to conditionally notify a user based on a value of the metric produced by the scoring engine.

14. The system of claim 13 wherein the raw data received from each remote device includes the location of the remote device.

15. The system of claim 13 wherein the period is a selectable time period for producing the metric.

16. The system of claim 13 wherein the multiple remote devices are geographically dispersed and communicate with the system using wireless communication networks.

* * * * *